(12) United States Patent
Awojulu et al.

(10) Patent No.: US 7,855,252 B2
(45) Date of Patent: Dec. 21, 2010

(54) END CAPPING ADDITIVE FOR POLYCONDENSATE POLYMER RESINS

(75) Inventors: Abiodun E. Awojulu, Woodhaven, MI (US); Roelof van der Meer, Halsteren (NL); Marco A. Villalobos, Canton, MI (US)

(73) Assignee: BASF Corporation, Wyandotte, MI (US)

( * ) Notice: Subject to any disclaimer, the term of this patent is extended or adjusted under 35 U.S.C. 154(b) by 0 days.

(21) Appl. No.: 12/139,955

(22) Filed: Jun. 16, 2008

(65) Prior Publication Data

US 2009/0312500 A1    Dec. 17, 2009

(51) Int. Cl.
*C08F 8/30*    (2006.01)

(52) U.S. Cl. .................. 525/123; 525/131; 525/132; 525/148; 525/153; 525/154; 525/163; 525/165; 525/166; 525/178; 525/180; 525/415; 525/450; 526/273; 526/317.1; 526/318; 526/319; 526/328; 526/328.5; 526/329.7; 526/346

(58) Field of Classification Search .......... 525/123, 525/131, 132, 148, 153, 154, 163, 165, 176, 525/178; 526/273, 317.1, 319, 328, 328.5, 526/329.7, 346
See application file for complete search history.

(56) References Cited

U.S. PATENT DOCUMENTS

| 6,270,855 | B1 | 8/2001 | Jung et al. |
|---|---|---|---|
| 6,472,472 | B2 | 10/2002 | Jung et al. |
| 6,552,144 | B1 | 4/2003 | Campbell et al. |
| 6,605,681 | B1 | 8/2003 | Villalobos et al. |
| 6,984,694 | B2 | 1/2006 | Blasius, Jr. et al. |
| 2004/0138381 | A1 * | 7/2004 | Blasius et al. ............... 525/131 |
| 2008/0206503 | A1 | 8/2008 | Blasius et al. |

OTHER PUBLICATIONS

The International Search Report and Written Opinion for PCT/US2009/045615 mailed Jan. 14, 2010.

* cited by examiner

*Primary Examiner*—David Wu
*Assistant Examiner*—Robert Jones, Jr.
(74) *Attorney, Agent, or Firm*—Foley & Lardner LLP

(57) ABSTRACT

A polymeric composition including a mono-functional, low molecular weight, low epoxy content end-cap which includes the polymerization product of at least one epoxy-functional monomer and at least one styrenic and/or (meth)acrylic monomer, with a polyfunctional chain extender; and at least one condensation polymer.

26 Claims, 4 Drawing Sheets

END CAPPING ADDITIVE FOR POLYCONDENSATE POLYMER RESINS

FIELD

The invention is generally related to polymers. More specifically, the invention is directed to low molecular weight end-caps for chain extending of polycarbonate and other materials, and article made of such materials.

BACKGROUND

Many condensation or step-growth polymers, including polyesters, polyamides, polycarbonates, and polyurethanes are widely used to make plastic products such as films, bottles, and other molded products. The mechanical and physical properties of these polymers are highly dependent on their molecular weights.

In a life cycle, these materials may experience a synthesis process, followed by an extrusion step, and a final processing step which may be another compounding/extrusion operation followed by profile or sheet forming, thermoforming, blow molding, or fiber spinning, or they can be injection or otherwise molded in the molten state. Typically, all of these steps occur under high temperature conditions. In addition, in recent years, increased attention has been focused on improved methods of reclaiming and recycling the plastics made from these polymers, with an eye toward resource conservation and environmental protection. The processing steps involved in recycling these polymers also involve high temperatures.

In each one of these high temperature steps, particularly during the compounding/processing and reclaiming/recycling processes, some degree of polymer molecular weight degradation occurs. This molecular weight degradation may occur via high temperature hydrolysis, alcoholysis or other depolymerization mechanisms that are well known to occur in such polycondensates. It is known that molecular weight degradation negatively affects the mechanical, thermal, and rheological properties of materials, thus preventing them from being used in demanding applications or from being recycled in large proportions for their original applications. Today, recycled or reprocessed polycondensates with deteriorated molecular weights can only be used in very low proportions in demanding applications or in larger proportions in less demanding applications. For instance, due to molecular weight degradation, recycled bottle grade polyethylene terephthalate (PET) is mostly employed exclusively in fiber and other low end applications. Similarly, recycled polycarbonate from compact disk (CD) scrap, mostly goes to low end applications. For these reasons, the current recycling technologies are limited to a narrow range of applications.

Today, there exist a considerable number of processes in the art employed to minimize loss in molecular weight and to maintain or even increase the molecular weight of the polycondensates for processing or recycling. Most of these routes employ as main processing equipment either an extruder, a solid state polycondensation reactor, or both, in sequence, or similar equipment designed for melt or high viscosity material processing. As an instrumental part of any of these processes, chemical reactants known in the art as "chain extenders" are employed. Chain extenders are, for the most part, molecules containing more than two functional groups that are included as additives in the reactor or extruder during any or all of the described processing steps with the purpose of "re-coupling" polycondensate chains that have depolymerized to some degree. Normally, the chain extender has two or more functional groups that are reactive with the chemical groups formed during the molecular weight degradation process. By reacting the chain extender molecule with two or more polycondensate fragments it is possible to re-couple them (by bridging them), thus decreasing or even reverting the molecular weight degradation process. In the art there are numerous chain extender types and compositions, polycondensate formulations, and processing conditions described to this end. For example, U.S. Pat. No. 6,984,694, which is incorporated by reference, represents one type of chain extender.

However, chain extenders have met with limited success in solving the problem of molecular weight degradation in reprocessed polymers. The shortcomings of copolymer chain extenders can be attributed, at least in part, to the fact that they are produced by conventional polymerization techniques which produce copolymers of very high molecular weight, and when coupled with a polycondensate can dramatically increase the molecular weight leading to localized gelation and other defects with physical characteristics which limit their capacity to act as chain extenders.

Most of the known chain extenders require the use of a pre-dried polycondensate material, operation at high vacuum, and varying amounts of catalyst and stabilizers, to be employed during processing. Without these features the extent of molecular weight increase is limited and the resulting product shows lower molecular weight and less than desired properties.

As the functionality of the chain extender increases, so does the number of polycondensate chains that can be coupled onto each chain extender molecule, and, thus, its effectiveness in re-building molecular weight. However, it is easy to see that as the polyfunctionality of these chain extenders increase so does the potential for the onset of gelation. Those of skill in the art are familiar with the strong negative effects associated with extensive crosslinking on the degree of crystallinity and thus on the mechanical properties of a semi-crystalline polycondensate, as well as the negative implications of the presence of varying amounts of gel in any product. For example, the high degree of branching or complete cross-linking that leads to gelation is undesirable for injection-molded thermoplastics due to the extremely high melt viscosity of resulting compositions. As a result of these negative effects there is a limit for the amount as well as functionality that can be employed with these chain extenders. Therefore effective chain extension currently requires relatively large concentrations of lower functionality (<4 functional groups/chain) chain extenders. Also, the maximum amount of chain extender that can be safely employed is limited in order to produce non-gelled compositions.

The relatively high costs associated with these two limitations of the current art, render the re-processing or recycling of these polycondensates uneconomical. Still other disadvantages are associated with many presently available chain extenders. For example, one disadvantage of polycondensates is the presence of certain types of end functional groups. Some of these functional groups can cause degradation of polymer molecular weight, such as carboxylic groups in some types of polycondensates often catalyze degradation of polymers by hydrolysis.

SUMMARY

In one aspect, mono-functional (i.e., only one functional group per chain), low molecular weight, epoxy-functional, low epoxy-content polymeric end-caps ("end-caps") and methods for using the end-caps to modify or improve the physical characteristics of polycondensates, blends of polycondensates, and products made from the improved polycondensates and polycondensate blends, are provided. The end-caps are the product of a polymerization reaction of an epoxy-functional monomer with at least one other monomer selected from an ethylenic, a styrenic and/or a (meth)acrylic monomer. As used herein, the terms "polycondensates" and "condensation polymers" are used broadly and synonymously to mean step-growth polymers. Thus, for the purposes of this specification and the appended claims, the two terms may be used interchangeably. The end-caps are suited for use as a polycondensate processing aid. The end-caps are also suited for use with the chain extension of reprocessed or recycled plastics.

In one aspect, mono-functional, low molecular weight, epoxy-functional, low epoxy-content end-caps made from a polymerization reaction of at least one epoxy-functional monomer with at least one ethylenic, styrenic and/or (meth)acrylic monomer, are provided.

In another aspect, polymeric compositions are provided, made from a condensation polymer that has been reacted with the end-caps and a chain extender. In some embodiments, plastic articles are prepared from the end-capped, chain extended polymeric compositions.

In another aspect, a method is provided for increasing the molecular weight of a condensation polymer by reacting the condensation polymer with epoxy functional end caps and a chain extender.

In another aspect, a method is provided for increasing the molecular weight of a condensation polymer by reacting the condensation polymer with the end-caps and a chain extender.

In another aspect, a polymeric composition is provided, made from a condensation polymer that has been reacted with the end-caps. In some embodiments, plastic articles are made from the end-capped polymeric compositions.

The end-capped polymeric compositions provide several advantages over non-end-capped polymeric compositions. For example, by end-capping a desired fraction of the condensation polymer in a chain extension process, one may be able to achieve a high degree of chain binding without inducing gelation. Furthermore, with the use of the end-caps, greater concentrations of chain extender may be used in the chain extension process without inducing gelation than would be the case in the absence of the end-caps. Also, with the end-caps, a chain extension process can be run in an extruder, which allows for greater control of the reaction and improved customization of the amount of each component in the reaction. Even outside of a chain extension application, the end-capped polymeric compositions have more desirable properties than the starting polymeric compositions, such as better flow/impact balance at lower polycondensate molecular weights and improved hydrolytic stability. The end-capped polymeric compositions also have advantages over conventional plasticizers used to provide impact/flow balance in polymeric compositions. Conventional plasticizers are subject to loss due to migration, leaching and other processes that can occur during the lifetime of polymeric compositions and articles derived therefrom. Loss of plasticizers results in negative effect on flow/impact properties. The end-capped polymeric compositions offer advantages due to chemical incorporation of the end-caps which act as reactive plasticizers. The end-capped compositions also allow incorporation of other multifunctional components into the polycondensate. This is possible as end-capped compositions have reduced functionality and therefore are not subject to gellation and other negative effects when reacted with multifunctional components. These multifunctional components can contain epoxides as well as other functionalities for reaction with the polycondensate.

DETAILED DESCRIPTION

Figure 1:
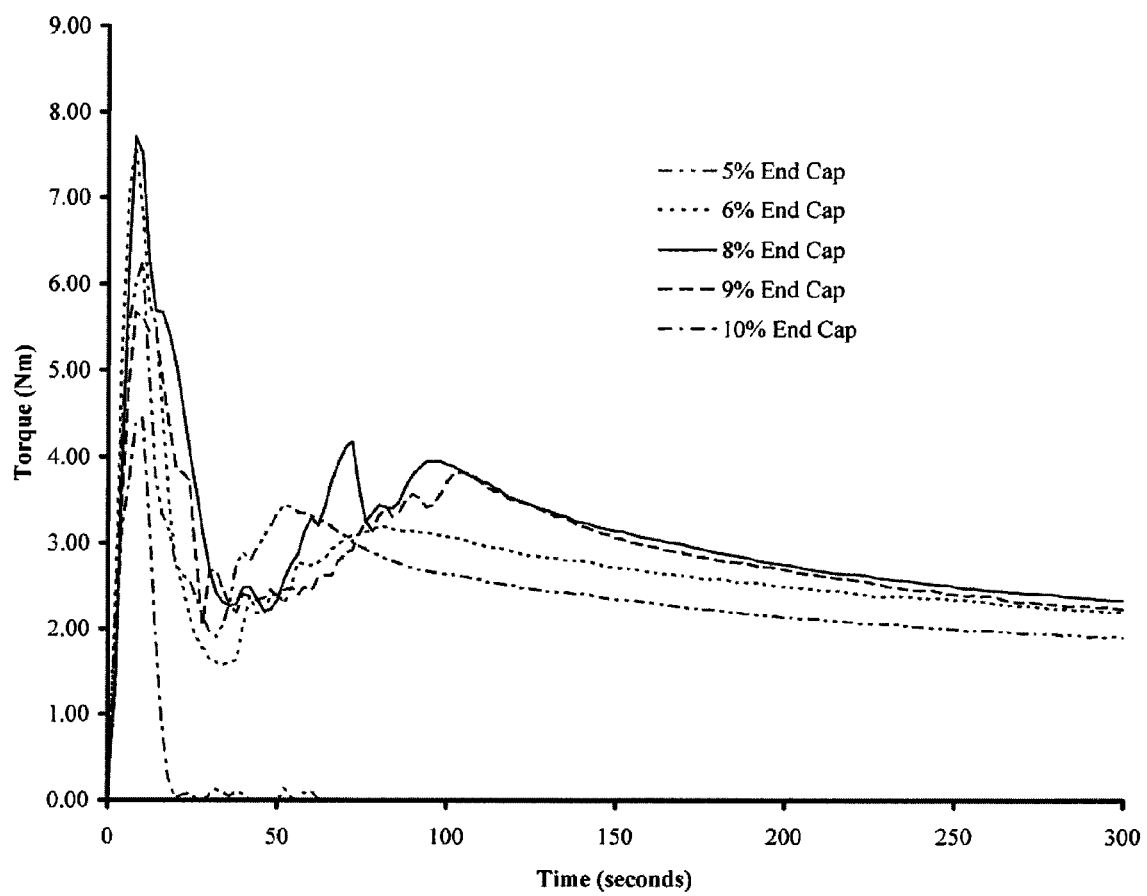
FIG. 1 is a graphical representation of torque v. time for polylactic acid/end cap 1 blends at 5, 6, 8, 9, and 10% end cap.

In one aspect, provided are mono-functional, epoxy functional, low epoxy content, low molecular weight polymeric end-caps for use with plastics, including reprocessed or recycled plastics. The end-caps, when used with chain extenders, are capable of reverting the post-processing molecular weight decrease in different polycondensates from the minimum value reached without chain extension, back to the initial molecular weight values or even larger than the original molecular weight values, without the incidence of gel and without adverse effects on mechanical, thermal, or rheological properties at a target polycondensate molecular weight. The end-caps make it possible to increase the molecular weight of polycondensates such as polyesters, polyamides, polycarbonates and others, in a controlled manner. In some embodiments, the end-caps are made from at least one epoxy-functional monomer and at least one monomer selected from ethylenic, styrenic and/or (meth)acrylic monomer.

As used herein, the term epoxy-functional includes both epoxides and functional equivalents of such materials, such as oxazolines. Examples of epoxy-functional monomers include, but are not limited to, those containing 1,2-epoxy groups such as glycidyl acrylate and glycidyl methacrylate. Other suitable epoxy-functional monomers include allyl glycidyl ether, glycidyl ethacrylate, glycidyl itoconate, and other glycidyl(meth)acrylates. As used herein, the term ethylenic includes monomers containing carbon-carbon double bonds. These include ethylenic and vinylic monomers. Examples of ethylenic and vinylic monomers are ethylene, propylene, vinyl chloride, vinyl bromide, vinyl fluoride, maleic anhydride, fumaric acid, acrylonitrile, methacrylonitrile, etc.

As used herein, the term (meth)acrylic includes both acrylic and methacrylic monomers. Examples of (meth)acrylic monomers include both acrylates and methacrylates. Suitable acrylate and methacrylate monomers for use in the end-caps include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and mixtures of these species. In certain embodiments the (meth)acrylic monomers are butyl acrylate and methyl methacrylate.

Suitable styrenic monomers, include, but are not limited to, styrene, α-methyl styrene, vinyl toluene, p-methyl styrene, t-butyl styrene, o-chlorostyrene, vinyl pyridine, and mixtures of these species. In certain embodiments, the styrenic monomers are styrene and α-methyl styrene.

In one embodiment, the end-caps contain about 4% to 15% by weight, based on the total weight of the monomers, of at least one epoxy-functional monomer and between about 90% and 96% by weight of at least one ethylenic, styrenic and/or (meth)acrylic monomer.

It has surprisingly been found that mono-functional, epoxy-functional, low epoxy content, low molecular weight end-caps produced from epoxy-functional monomers and ethylenic, styrene and/or (meth)acrylic monomers and having certain physical properties end-cap polycondensate chains. By processing the end-caps with a chain extender and a polycondensate, a high degree of chain binding may be achieved without inducing gelation. This allows the present end-caps to produce chain extended condensation polymers that are substantially free from gel particles. In addition, these properties lead to a variety of processing advantages which will be discussed in more detail below. As used herein, the phrase "substantially free from gel particles" means the chain extension reaction takes place in such a manner that gel particle formation is avoided to any extent. Furthermore, the end-caps impart certain desirable properties on polycondensates that have been reacted with the end-caps outside of chain extension applications.

Without wishing or intending to be bound to any particular theory, it is believed that the surprising advantages of the mono-functional nature of the low molecular weight, low epoxy content, epoxy-functional end-caps result from favorable combinations of certain Efn, PDI, and EEW values possessed by these end-caps. Specifically, the provided end-caps having the following characteristics: 1) low number average epoxy functionality (Efn): Efn values of up to about one; 2) controlled PDI values ranging from about 2 to 6, including ranges from about 2 to 5, and further including ranges from about 2 to 3.5; 3) epoxy equivalent weight (EEW): from about 500 to 6000, including from about 750 to 5000, and further including from about 1000 to 4000; 4) molecular weights (number average molecular weight ($M_n$)<4000, weight average molecular weight ($M_w$)<14000. In addition, the end-caps possess a wide range of solubility parameters tailored for high solubility in polycondensates. In various exemplary embodiments, the chain extenders have an EEW of from about 1000 to 4000, an Efn value of about 1 and a PDI of from about 2 to 3.5.

The desired epoxy equivalent weight (EEW) is fixed by the desired content of the epoxy-functional monomer employed (GMA or other). Additionally, at a given EEW, the Efn per chain can be tailored from very low to very high (e.g. >30) by controlling the $M_n$ of the end-cap. Moreover, for a given EEW the Efw can be designed by altering the polydispersity index of the end-cap (PDI=Mw/Mn=Efw/Efn) through changes in composition, processing conditions, and molecular weight. Suitable values of Efw include values of up to about 3.5, or even higher than 3.5, including Efw values ranging from about 2 to 5, and further including values ranging from about 2 to 3.5.

The end-caps may by produced according to standard techniques well known in the art. Such techniques include, but are not limited to, continuous bulk polymerization processes, batch, and semi-batch polymerization processes. Production techniques that are well suited for the end-caps are described in U.S. Pat. Nos. 6,552,144 and 6,605,681, the entire disclosures of which are incorporated herein by reference. Briefly, these processes involve continuously charging into a reactor at least one epoxy-functional monomer, at least one ethylenic, styrenic and/or (meth)acrylic monomer, and optionally one or more other monomers that are polymerizable with the epoxy-functional monomer, the ethylenic, styrenic monomer, and/or the (meth)acrylic monomer. This process surprisingly produces low molecular weight copolymer compositions having epoxy equivalent weights, number average epoxy functionalities (Efn), weight average epoxy functionalities (Efw), and polydispersity indexes (PDI) (PDI=Efw/Efn) that are conducive to end-capping polycondensates and, in combination with a chain extender, dramatically increase the molecular weight of reprocessed plastics without gelation when used in small quantities in the absence of any pretreatment or additional catalysts.

The proportion of monomers charged into the reactor may be the same as those proportions that go into the end-caps discussed above. Thus, in some embodiments, the reactor may be charged with about 4% to 15%, by weight, of at least one epoxy-functional monomer and with about 85% to 96%, by weight, of at least one ethylenic, styrenic and/or (meth) acrylic monomer.

The reactor may also optionally be charged with at least one free radical polymerization initiator and/or one or more solvents. Examples of suitable initiators and solvents are provided in U.S. Pat. Nos. 6,552,144 and 6,605,681 Briefly, the initiators suitable for carrying out the process are compounds which decompose thermally into radicals in a first order reaction, although this is not a critical factor. Suitable initiators include those with half-life periods in the radical decomposition process of about 1 hour at temperatures greater or equal to 90° C. and further include those with half-life periods in the radical decomposition process of about 10 hours at temperatures greater than, or equal to, 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane, 2,2'-azo-bis-(2-methyl) butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)hexyne-3, and other similar initiators well known in the art. In some embodiments, the initiators are di-t-butyl peroxide and/or di-t-amyl peroxide.

The initiator may be added with the monomers. The initiators may be added in any appropriate amount, but preferably the total initiators are added in an amount of about 0.0005 to 0.06 moles initiator(s) per mole of monomers in the feed. For this purpose initiator is either admixed with the monomer feed or added to the process as a separate feed.

The solvent may be fed into the reactor together with the monomers, or in a separate feed. The solvent may be any solvent well known in the art, including those that do not react with the epoxy functionality on the epoxy-functional monomer at the high temperatures of the continuous process described herein. The proper selection of solvent may help decrease or eliminate the gel particle formation during the continuous, high temperature reaction. Such solvents include, but are not limited to xylene; toluene; ethyl-benzene; Aromatic-100®, Aromatic 150®, Aromatic 200®, all of which are available from Exxon; acetone; methylethyl ketone; methyl amyl ketone; methyl-isobutyl ketone; n-methyl pyrrolidinone; and combinations of any two or more such solvents. When used, the solvents are present in any amount desired, taking into account reactor conditions and monomer feed. In one embodiment, one or more solvents are present in an amount of up to 40% by weight, or up to 15% by weight, in other embodiments, based on the total weight of the monomers.

The reactor is maintained at an effective temperature for an effective period of time to cause polymerization of the monomers to produce a mono-functional, epoxy-functional, low epoxy content, low molecular weight end-cap from the monomers.

A continuous polymerization process allows for a short residence time within the reactor. The residence time is generally less than one hour, and may be less than 15 minutes. In some embodiments, the residence time is generally less than 30 minutes, and may be less than 20 minutes.

The process for producing the end-caps may be conducted using any type of reactor well-known in the art, and may be set up in a continuous configuration. Such reactors include, but are not limited to, continuous stirred tank reactors ("CSTRs"), tube reactors, loop reactors, extruder reactors, or any reactor suitable for continuous operation.

A form of CSTR which has been found suitable for producing the chain extenders is a tank reactor provided with cooling coils and/or cooling jackets sufficient to remove any heat of polymerization not taken up by raising the temperature of the continuously charged monomer composition so as to maintain a preselected temperature for polymerization therein. Such a CSTR may be provided with at least one, and usually more, agitators to provide a well-mixed reaction zone. Such CSTR may be operated at varying filling levels from 20 to 100% full (liquid full reactor LFR). In one embodiment the reactor is more than 50% full but less than 100% full. In another embodiment the reactor is 100% liquid full.

The continuous polymerization is carried out at high temperatures. In one embodiment, the polymerization temperatures range from about 180° C. to 350° C., this includes embodiments where the temperatures range from about 190° C. to 325° C., and more further includes embodiment where the temperatures range from about 200° C. to 300° C. In another embodiment, the temperature may range from about 200° C. to 275° C. Due to their high temperature synthesis the end-caps show high thermal stability when used later in chain extending applications in condensation polymer compositions processed at similar temperature ranges. In contrast, other end-caps presently available undergo degradation and gas evolution under these conditions.

In another aspect, chain extended polymeric compositions are provided that are made by reacting the end-caps with a chain extender and condensation polymer(s) to form a substantially gel-free chain extended condensation polymer composition. Suitable condensation polymers include, but are not limited to, polyesters (PEs), polyamides (PAs), polycarbonates (PCs), polyurethanes (PUs), polyacetals, polysulfones, polyphenylene ethers (PPEs), polyether sulfones, polyimides, polyether imides, polyether ketones, polyetherether ketones, polyarylether ketones, polyarylates, polyphenylene sulfides, polyester-carbonates and polyalkyls. In one embodiment, the condensation polymer is a polyester selected from the family of polyethylene terephthalates (PETs), polypropylene terephthalates (PPTs), and polybutylene terephthalates (PBTs). In another embodiment the condensation polymer is a reprocessed or recycled condensation polymer. As used herein, the term "reprocessed" means a polymer reclaimed from a production facility originally scrapped for not meeting quality control or specification targets. Amongst these can be included products out of specification from compounding, extrusion, or molding start-up and shut down production and/or products from general production out of specification or otherwise not meeting product quality specifications. Also, included in the definition of reprocessed products are products processed to final use form but not meeting product specifications, such as product out of caliber or dimensions, color, shape, etc., or waste process material such as injection runners, edges, trim and flashes, etc. As used herein the term recycled condensation polymer means a condensation plastic reclaimed a posteriori from its final use from diverse sources, this include but is not limited to scrap from soda bottles, detergent bottles, plastic toys, engine components, assembled plastic components, films, fibers, CDs, DVDs, and the like.

The polyesters may be homo- or copolyesters that are derived from aliphatic, cycloaliphatic or aromatic dicarboxylic acids and diols or hydroxycarboxylic acids. In addition, mixtures of these polyesters or of polyesters with further plastics are also suitable, for example blends of PBT/PC, PBT/acrylonitrile-butadiene-styrene (ABS), PET/PA, and the like. Their composition will depend essentially on the desired properties for a specific end use. Such polyesters are well known in the art. Particularly suitable polyesters are PET, PBT and corresponding copolymers and blends, as exemplified by PBT/PC, PBT/ASA, PBT/ABS, PET/ABS, PET/PC or also PBT/PET/PC, which predominantly contain the indicated polyesters; PET and its copolymers as well as PBT blends being the preferred choice in certain embodiments.

As used herein, the term "polyamide" includes various well known polyamide resins. These include polyamides produced by polycondensing a dicarboxylic acid with a diamine, polyamides produced by polymerizing a cyclic lactam, and polyamides produced by co-polymerizing a cyclic lactam with a dicarboxylic acid/diamine salt. The polyamides include polyamide elastomer resins. Suitable polyamide elastomer resins include nylon 6, nylon 6-6, nylon 6-10, nylon 11, nylon 12, and co-polymers and blends of any two or more such polyamides.

As used herein, the term "polycarbonate" includes various well known polycarbonate resins. These include aromatic polycarbonates produced by reactions of bisphenols with carbonic acid derivatives such as those made from bis-phenol A (2,2-bis(4-hydroxyphenyl)propane) and phosgene or diphenyl carbonate. Various modified polycarbonates and copolycarbonates made from other types of bisphenols such as those where phenolic radicals in the para position are bridged via C, O, S or alkylene are also included. Polyestercarbonates made from one or more aromatic dicarboxylic acids or hydroxycarboxylic acids, bisphenols and carbonic acid derivatives are also included. Polycarbonate resins may also be prepared from bis-phenol A and carbonic acid derivatives.

The thermoplastic polyurethanes may be prepared by any conventional process, as known in the art. Typical polyurethanes are made from a polyol intermediate and generally an equivalent amount of a polyisocyanate. The polyol intermediate is generally a liquid polyether polyol or a polyester polyol or combinations of any two more.

Polyether polyols that are used to produce the polyurethanes are generally made by reacting an alkylene oxide, such as propylene oxide, with a strong base such as potassium hydroxide, optionally in the presence of water, glycols and the like. Other polyethers which can be utilized include, but are not limited to, those which are produced by polymerization of tetrahydrofuran or epoxides such as epichlorohydrin, ethylene oxide, propylene oxide, butylene oxide, styrene oxide, for example in the presence of Lewis catalysts such as boron trifluoride, or by the addition of epoxides, optionally mixed or in succession, onto starter components with reactive hydrogen atoms such as water, alcohols, ammonia, or amines.

The polyester polyols that may be used to form the thermoplastic polyurethanes may be formed from the condensation of one or more polyhydric alcohols with one or more polycarboxylic acids. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy) propane, 1,4- and 2,3-butylene glycol, neopentyl glycol, 1,4-bis-(hydroxymethyl)cyclohexane, trimethylolethane, together with di-, tri-, tetra-, and higher polyethylene glycols, di- and higher polypropylene glycols, together with di- and higher polybutylene glycols, and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides such as tetrahydrophthalic anhydride, hexahydrophthalic anhydride, tetrachlorophthalic anhydride, endomethylenetetrahydrophthalic anhydride; acid chlorides and acid esters such as phthalic anhydride, phthaloyl chloride and the dimethyl ester of phthalic acid; dimerized and trimerized unsaturated fatty acids, optionally mixed with monomeric unsaturated fatty acids, terephthalic acid monomethyl ester and terephthalic acid monoglycol ester.

The polyacetals usable in the present thermoplastic resin compositions are crystalline thermoplastic resins, sometimes called polyoxymethylene (POM). Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Suitable polyacetals may also be obtained by the polymerization of cyclic acetals. Other specific examples of polyacetals include formaldehyde homopolymers and copolymers of trioxane (i.e., trimer of formaldehyde) and a small amount of cyclic ethers such as ethylene oxide and 1,3-dioxane.

End capping of polycondensates may be accomplished through any conventional means, many of which are known in the art. For example, end-capping of the polycondensates may be accomplished through dry tumbling together or cofeeding an end capping additive with a desired polycondensate. The end-capping additive may then be melt or solution blended with the polycondensate by methods well known in the art, such as by reactive extrusion. Examples of suitable reactors for reactive extrusion include single and twin screw extruders systems, of different screw designs, configurations, L/D ratios (length to diameter ratios) and compression ratios, operating at suitable RPM's to provide the prescribed average residence times at known feed rates. Other suitable reactors include Banbury mixers, Farrell continuous mixers, Buss co-kneaders, and roll mills. These systems may operate at temperatures above the $T_g$ of the end capping additive and above the $T_g$ and/or $T_m$ of the polycondensate in what is known in the art as reactive extrusion. The average residence time in the reactor may vary, but the end capping additives need only short residence times. Typically, the residence times will range from about 0.5 to 15 minutes. This includes embodiments where the residence time is from about 1 minute to 10 minutes and further includes embodiments where the residence time is from about 2 minutes to 7 minutes.

Chain extension of the end-capped polycondensates may be accomplished through any conventional means, many of which are known in the art. For example, chain extension of the end-capped polycondensates may be accomplished through dry tumbling together or cofeeding a chain extender with a desired end-capped polycondensate. The chain extender may then be melt or solution blended with the end-capped polycondensate by methods well known in the art, such as by reactive extrusion. In addition, other suitable formulation ingredients such as pigments, fillers, reinforzants, or additives such as stabilizers, antioxidants, lubricants, and/or any other additives known in the art needed for specific applications may be added to the formula in typical amounts. Examples of suitable reactors for reactive extrusion include single and twin screw extruders systems, of different screw designs, configurations, L/D and compression ratios, operating at suitable RPM's to provide the prescribed average residence times at known feed rates. Other suitable reactors include Banbury mixers, Farrell continuous mixers, Buss co-kneaders, and roll mills. These systems may operate at temperatures above the $T_g$ of the chain extender and above the $T_g$ and/or $T_m$ of the end capped polycondensate in what is known in the art as reactive extrusion. The average residence time in the reactor may vary. Typically, the residence times will range from about 0.5 to 15 minutes. This includes embodiments where the residence time is from about 1 minute to 10 minutes and further includes embodiments where the residence time is from about 2 minutes to 7 minutes.

The chain extending operations can be followed by plastic forming operations such as extrusion, molding and fiber spinning. The reactive extrusion can also take place within primary processing equipment without pre-compounding. Alternatively, the compounding may be followed by a finishing step such as solid state polymerization and may be processed in any reactor system and configuration operating at temperatures above the $T_g$ of the chain extender and between the $T_g$ and $T_m$ of the polycondensate for an average residence time between 1 and 24 hours, including from 2 to 18 hours, and further including 3 to 12 hours. Examples of suitable reactors for solid state polymerization are well known in the art, and operational modes of the same include batch, semi-batch and continuous solid state polymerization. In one embodiment, the blend, co-feed, or separate-feed is processed in a combination process comprising suitable arrays of reactive extrusion and solid state polymerization processes known in the art, operating within the ranges given above, and in which chain extender may be added to either or both stages.

Processing may be followed by a polymer recovery and a pelletization stage to obtain pellets or granules of the chain extended polycondensates suitable for further processing.

The end-caps provide a number of processing advantages compared to other end-caps. For example, unlike many of the low molecular weight end-caps currently available, the end-caps do not suffer from high volatility and therefore well suited for use in high temperature environments, particularly in an extruder. Furthermore, because the end-caps are not characterized by high molecular weight, the present end-caps are compatible with a wide variety of polycondensates. Thus, in various embodiments, the end-capped, chain-extended condensation polymers are substantially free of gel particles and are produced by reacting the end-capped polycondensates and the chain extender in a single stage of conventional equipment in the absence of additional catalyst and/or without vacuum operation. Furthermore, in some of these embodiments, the end-capped, chain extended polycondensates obtained have molecular weights that are similar to or higher than those obtained through solid state polymerization, and have properties that are similar or even better than those obtained through solid state polymerization, thus allowing for the replacement of expensive and cumbersome solid state polymerization processes by simpler reactive extrusion processes.

The end-caps are effective at increasing the molecular weight of reprocessed or recycled chain extended condensation polymers without formation of any significant amount of gel. This is evidenced by the increase in the intrinsic viscosity of the end-capped condensation polymers following chain extension. For example, in some instances the end-caps may increase the intrinsic viscosity of the end-capped, chain extended condensation polymer back to within 15% of the intrinsic viscosity of the condensation polymer prior to recycling or reprocessing, where intrinsic viscosity is measured according to ASTM D-2857. This includes embodiments where the intrinsic viscosity of the end-capped, chain extended condensation polymer may increase back to within 10% of the intrinsic viscosity of the condensation polymer prior to recycling or reprocessing, and further includes embodiments where the intrinsic viscosity of the end-capped, chain extended condensation polymer may increase back to within 5% of the intrinsic viscosity of the condensation polymer prior to recycling or reprocessing.

The increase in the viscosity of the condensation polymers following end-capping and chain extension may also be measured by melt viscosity as measured by capillary rheometry. For example, in some instances the end-caps may increase the melt viscosity of the chain extended condensation polymer as measured by capillary rheometry at 100 s$^{-1}$, by up to 300% relative to the initial post-processing melt viscosity of the condensation polymer. This includes embodiments where this increase in melt viscosity is realized without the need for any pre-drying of the condensation polymer, catalyst, vacuum operation, or solid state polymerization steps.

The increase in the molecular weight of the condensation polymers following end-capping and chain extension is also demonstrated by the decrease in the melt flow index (MFI) of the condensation polymer after end-capping and chain extension has occurred. For example, in some instances the melt flow index (MFI) of the end-capped, chain extended condensation polymer, as measured by ASTM-D-1238, may be only about 60% or less of the MFI of the reprocessed or recycled condensation polymer or of the initial MFI of a low grade condensation polymer. This includes embodiments where this decrease in MFI is realized in a melt blending process without the need for any pre-drying of the condensation polymer, catalyst, vacuum operation, or solid state polymerization steps.

Due to their ability to provide recycled or processed materials with properties equivalent to those of the un-recycled or un-processed materials, the end-caps have the advantage that more of the recycled or reprocessed material can be incorporated into the final product. The end-caps have the mechanical, thermal and impact properties of end-capped, chain extended polycondensates are not negatively impacted, and in many instances, are enhanced with respect to those of the un-recycled or un-processed polycondensates. Moreover, the end-caps allow the use of higher concentrations of chain extender than would be the case were the chain extension to proceed without end-capping the polycondensate.

The end-caps impart advantageous properties to polycondensates even outside the context of chain extension applications. For example, polycondensates end-capped with the end-caps typically have increased flexibility. Thus, the end-capped polycondensates are plasticized materials with advantages over polycondensates containing conventional plasticizers. In particular, end-capped polycondensates do not lose or otherwise show a loss in flexibility due to migration or otherwise losing the plasticizer to the environment. Loss of conventional plasticizer to environment is a significant hazard which is not found in the case of end-capped polycondensates. As used herein, the phrase "increased flexibility" refers to a reduction in glass transition temperature of the composition. This reduction in glass transition temperature can also manifest in increased flexibility as measured by elongation. As used herein, "higher flexibility" is synonymous with "increased flexibility."

The end-caps impart other advantages to polycondensates also. For example, end-capped polycondensates with or without further chain extension show improved hydrolytic stability in comparison with the polycondensates. Without biding to any specific hypothesis or theory this effect is considered to arise from the reaction of end capping agents with certain functional groups in polycondensates. The presence of such functional groups contributes to hydrolysis of the polycondensate.

The end-caps may be used with lower grade virgin polycondensates in order to make such polycondensates suitable for uses for which they would not otherwise be used. For example, an end-capped, chain extended lower grade condensation polymer, such as a polyester, may have an intrinsic viscosity that permits the polymer to be used in more demanding applications. This includes embodiments where the intrinsic viscosity of the end-capped, chain extended lower grade condensation polymer is increased by at least 2%, at least 5%, at least 10%, at least 20%, at least 30%, at least 40%, and even at least 50% by reaction with an end-cap and a chain extender. "Lower grade" polycondensate, as used herein, means a resin grade with comparatively lower molecular weight with respect to other grades in the same chemical family, exhibited as lower I.V. (intrinsic viscosity), or lower melt viscosity at given conditions, which also results in lower physical properties than the other grades in the same family.

Applications include, but are not limited to, recycling of scrap plastics, such as polyesters, polycarbonates, polyamides, and blends and alloys of scrap plastics by either a reactive extrusion or a solid state polymerization process, and post-processing of the recycled material through extrusion/blow molding into various articles including, but not limited to, food or non-food contact containers and transparent colored applications, films, coatings, tapes, moldings, fibers, strapping and other consumer products.

In general the mono-functional, epoxy-functional, low epoxy-content, low molecular weight end-caps show storage stability, safety of handling, no need for catalysts for effective chain extension, resistance to hydrolysis, and low volatility.

One skilled in the art will readily realize that all ranges discussed can and do necessarily also describe all subranges therein for all purposes and that all such subranges also form part and parcel of this disclosure. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

The following abbreviations are used: GMA is glycidyl methacrylate; DTBP is di-tert-butyl peroxide; WFE=wiped film evaporator; $M_n$ is the number average molecular weight; $M_w$ is the weight average molecular weight; $M_z$ is the z-average molecular weight; NV is non volatile(s); and IPA is isopropanol.

Example 1

Several mono-functional, low molecular weight, epoxy-functional, low epoxy-content end-capping additives were designed and prepared in a two-gallon radical continuous polymerization reactor system according to the teachings of U.S. Pat. Nos. 6,984,694 and 6,552,144. The components used and the specific production conditions are given below in Tables 1 and 2, respectively.

TABLE 1

| Components | | |
|---|---|---|
| Ingredient | Fresh Feed | Recycle |
| Butyl Acrylate (wt %) | 89.59 | 15.0 |
| GMA (wt %) | 4.71 | |
| Isopropanol (wt %) | 4.20 | 65.0 |
| n-butanol (wt %) | — | 20.0 |
| DTBP (wt %) | 1.50 | — |
| Total | 100.00 | 100.0 |

TABLE 2

| | Process Conditions | | | | |
|---|---|---|---|---|---|
| | Run | | | | |
| | A | B | C | D | E |
| Time | 8:45 | 10:05 | 11:25 | 12:45 | 14:05 |
| Rx Product (° F.) | 470.6 | 469.7 | 469.9 | 469.9 | 469.1 |
| Rx Jacket (° F.) | 482.0 | 479.7 | 479.2 | 478.9 | 478.5 |
| Reactor PSI | 335.3 | 322.8 | 314.9 | 316.5 | 313.9 |
| WFE Jacket (° F.) | 480.6 | 480.0 | 480.1 | 480.1 | 480.3 |
| Vacuum (PSIA) | 13.2 | 12.5 | 12.5 | 12.5 | 12.5 |
| Feed Rate (lb/m) | 1.00 | 1.00 | 1.00 | 1.00 | 1.00 |
| Total Overhead | 0.20 | 0.20 | 0.19 | 0.19 | 0.19 |
| Recycle Rate (lb/m) | 0.15 | 0.15 | 0.14 | 0.14 | 0.14 |
| Purge Rate (lb/m) | 0.05 | 0.05 | 0.05 | 0.05 | 0.05 |
| Purge (%) | 25 | 25 | 25 | 25 | 25 |
| Residence | 12 | 12 | 12 | 12 | 12 |

The following data in Tables 3-5 applies to end-caps produced in accordance with the conditions set forth in Tables 1 and 2.

TABLE 3

| | Physical Properties | | | | |
|---|---|---|---|---|---|
| | Run | | | | |
| | A | B | C | D | E |
| Mn | 1034 | 1092 | 1106 | 1120 | 1125 |
| Mw | 1648 | 1785 | 1843 | 1849 | 1861 |
| Mz | 2667 | 2928 | 3122 | 3041 | 3065 |
| Polydispersity | 1.594 | 1.634 | 1.667 | 1.651 | 1.655 |
| % NV | 94.77 | 95.20 | 95.82 | 95.42 | 95.19 |
| Viscosity cps | 509 | — | — | — | 646 |
| % IPA | 0.0796 | 0.0238 | 0.0209 | 0.0305 | 0.0233 |
| % n-butanol | 0.2485 | 0.4430 | 0.4323 | 0.4688 | 0.3933 |
| % Butyl Acrylate | 0.1903 | 0.1022 | 0.0984 | 0.1239 | 0.1119 |
| % GMA | 0.0337 | 0.0246 | 0.0254 | 0.0280 | 0.0250 |

TABLE 4

| | End-Cap Composition | | | | |
|---|---|---|---|---|---|
| | Run | | | | |
| | A | B | C | D | E |
| % BA | 95.01 | 95.01 | 95.01 | 95.01 | 95.00 |
| % GMA | 4.99 | 4.99 | 4.99 | 4.99 | 5.00 |

TABLE 5

| | End-cap Composition | |
|---|---|---|
| Run | A (epoxy equivalent weight) | E (epoxy equivalent weight) |
| Theoretical | 2848 | 2845 |
| Titrated | 2990 | 2962 |

Example 2

The end-capping additive designed and prepared as described above in Example 1 was evaluated for use as a processing aid of polylactic acid (PLA 4042D, Natureworks Company). The mixing bowl conditions are set forth in Table 6, below. The reaction was carried out in a Brabender conical twin screw extruder. Low torque values versus time were observed at end-cap concentrations of 8-10 wt %, as depicted in FIG. 1, demonstrating successful end-capping.

TABLE 6

| | Mixing Conditions | | | | | |
|---|---|---|---|---|---|---|
| | 1 | 2 | 3 | 4 | 5 | 6 |
| PLA (wt %) | 95.00 | 93.00 | 92.00 | 91.00 | 90.50 | 90.00 |
| End-Cap (Example 1) (wt %) | 5.00 | 7.00 | 8.00 | 9.00 | 9.50 | 10.00 |
| TOTAL | 100.0 | 100.0 | 100.0 | 100.00 | 100.00 | 100.00 |
| Temperature (° C.) | 210 | 210 | 210 | 210 | 210 | 210 |

TABLE 6-continued

| Mixing Conditions | | | | | | |
|---|---|---|---|---|---|---|
| | 1 | 2 | 3 | 4 | 5 | 6 |
| Screw Speed (rpm) | 50 | 50 | 50 | 50 | 50 | 50 |
| Residence time (min) | 5 | 5 | 5 | 5 | 5 | 5 |

Example 3

Figure 2:
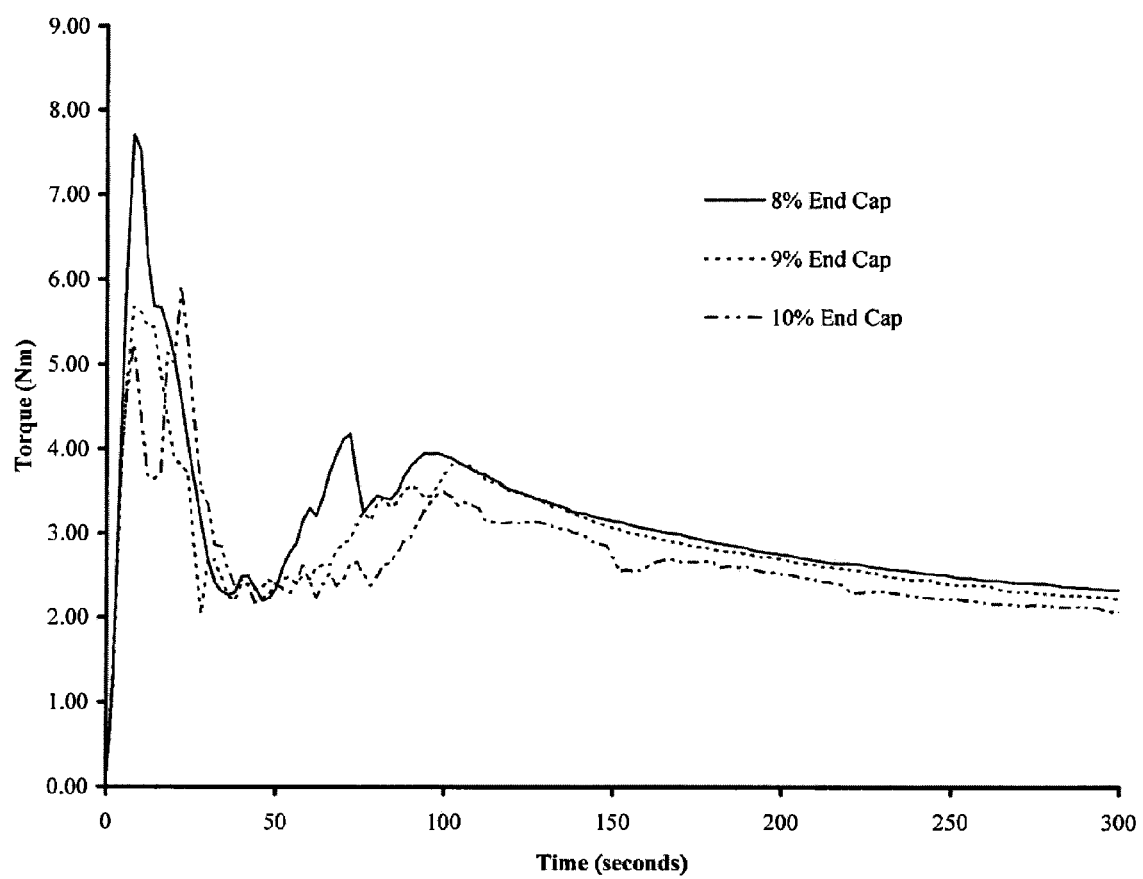
FIG. 2 is a graphical representation of torque v. time for polylactic acid/end cap 1 blends at 8, 9, and 10% end cap.

The end-capped PLA designed and prepared as described above in Example 2 was evaluated for use in a chain extension process. The chain extender was designed and prepared in accordance with the teachings of U.S. Pat. Nos. 6,984,694 and 6,552,144. The mixing bowl conditions are set forth in Table 7 below. The reaction was carried out in a Brabender conical twin screw extruder. The end-capped, chain extended PLA blends made with end-cap concentrations of 8-10 wt % proved similar to virgin PLA without any additives, as depicted in FIG. 2.

TABLE 7

| Mixing Conditions | | | | | |
|---|---|---|---|---|---|
| | 1 | 2 | 3 | 4 | 5 |
| PLA (wt %) | 100.00 | 97.00 | 0.00 | 0.00 | 0.00 |
| PLA/End-Cap (8% wt) | 0.00 | 0.00 | 97.00 | 0.00 | 0.00 |
| PLA/End-Cap (9% wt) | 0.00 | 0.00 | 0.00 | 97.00 | 0.00 |
| PLA/End-Cap (10% wt) | 0.00 | 0.00 | 0.00 | 0.00 | 97.00 |
| Chain Extender (wt %) | 0.00 | 3.00 | 3.00 | 3.00 | 3.00 |
| TOTAL | 100.00 | 100.00 | 100.00 | 100.00 | 100.00 |
| Temperature (C.) | 210 | 210 | 210 | 210 | 210 |
| Screw Speed (rpm) | 50 | 50 | 50 | 50 | 50 |
| Residence time (min) | 5 | 5 | 5 | 5 | 5 |

Example 4

Figure 3:
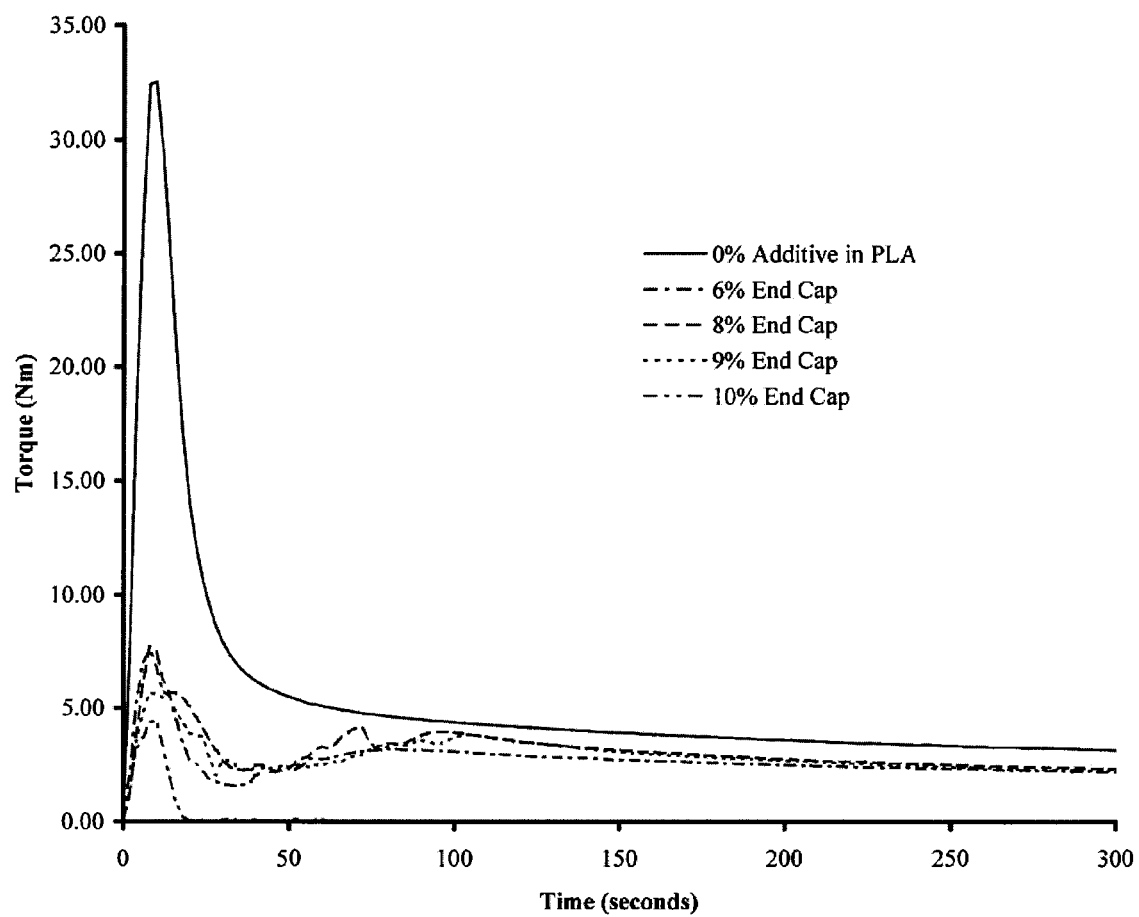
FIG. 3 is a graphical representation of torque v. time for polyethyleneterephthalate/end cap 1 blends at 8, 9, and 10% end cap.

The end-cap designed and prepared as described above in Example 1 was evaluated for use as a processing aid of polyethyl terephthalate (PET WA 314, Eastman Corporation). The mixing bowl conditions are set forth in Table 8 below. The reaction was carried out in a Brabender conical twin screw extruder. Low torque values versus time were observed at end-cap concentrations of 8-10 wt %, as depicted in FIG. 3, demonstrating successful end-capping.

TABLE 8

| Mixing Conditions | | | |
|---|---|---|---|
| | 1 | 2 | 3 |
| PET (wt %) | 92.00 | 91.00 | 90.00 |
| End-Cap (Example 1) (wt %) | 8.00 | 9.00 | 10.00 |
| TOTAL | 100.0 | 100.0 | 100.0 |
| Temperature (° C.) | 260 | 260 | 260 |
| Screw Speed (rpm) | 50 | 50 | 50 |
| Residence time (min) | 5 | 5 | 5 |

Example 5

Figure 4:
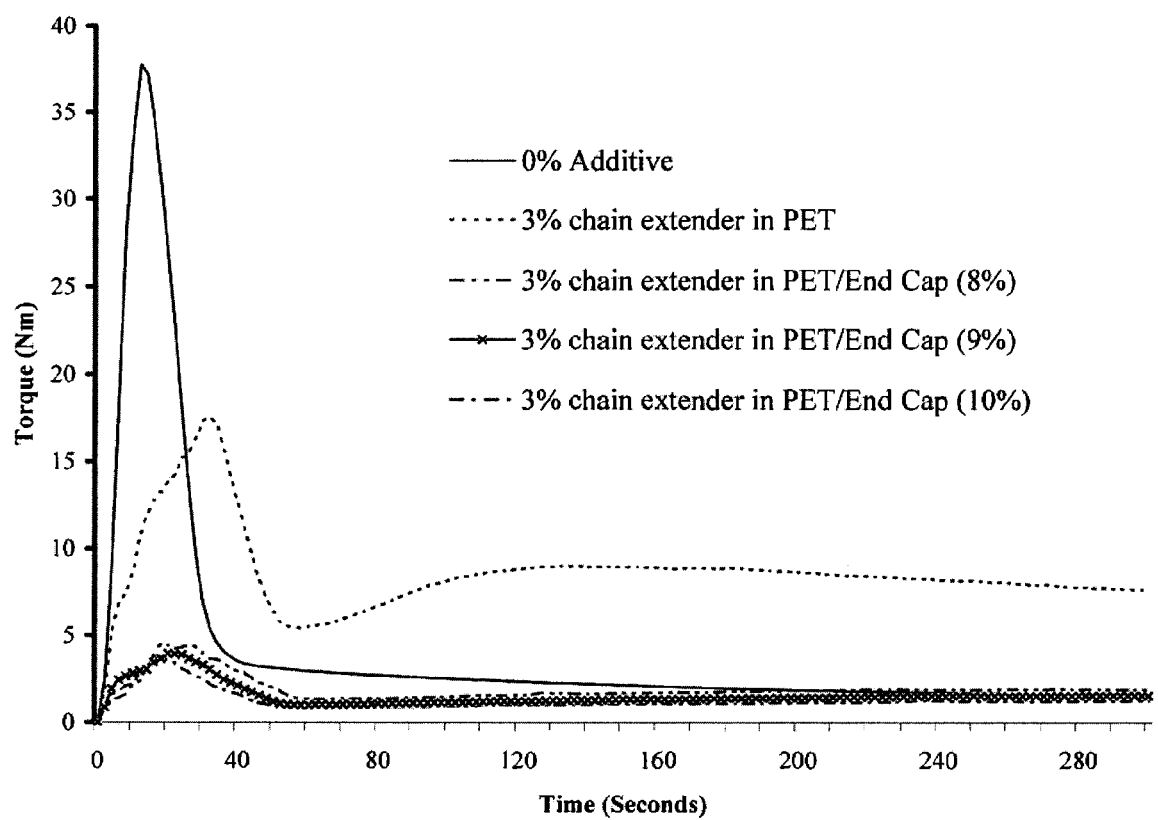
FIG. 4 is a graphical representation of torque v. time for 3% chain extender in polyethyleneterephthalate/end cap 1 blends at 8, 9, and 10% end cap.

The end-capped PET designed and prepared as described above in Example 4 was evaluated for use in a chain extension process. The chain extender was designed and prepared in accordance with the teachings of U.S. Pat. Nos. 6,984,694 and 6,552,144. The mixing bowl conditions are set forth in Table 9 below. The reaction was carried out in a Brabender conical twin screw extruder. The end-capped, chain extended PET blends made with end-cap concentrations of 8-10 wt % proved similar to virgin PET without any additives, as depicted in FIG. 4.

TABLE 9

| Mixing Conditions | | | | | |
|---|---|---|---|---|---|
| | 1 | 2 | 3 | 4 | 5 |
| PET (wt %) | 100.00 | 97.00 | 0.00 | 0.00 | 0.00 |
| PET/End-Cap (8% wt) | 0.00 | 0.00 | 97.00 | 0.00 | 0.00 |
| PET/End-Cap (9% wt) | 0.00 | 0.00 | 0.00 | 97.00 | 0.00 |
| PET/End-Cap (10% wt) | 0.00 | 0.00 | 0.00 | 0.00 | 97.00 |
| Chain Extender | 0.00 | 3.00 | 3.00 | 3.00 | 3.00 |
| TOTAL | 100.00 | 100.00 | 100.00 | 100.00 | 100.00 |
| Temperature (° C.) | 260 | 260 | 260 | 260 | 260 |
| Screw Speed (rpm) | 50 | 50 | 50 | 50 | 50 |
| Residence time (min) | 5 | 5 | 5 | 5 | 5 |

Example 6

Differential Scanning Calorimetry was used to measure the $T_g$ of polymeric compositions containing polycondensates, and the end-capping additive of Example 1 at various concentrations. Compositions used for this work and the corresponding measured $T_g$ values are shown in Table 10. The results indicate that the $T_g$ values were reduced for compositions containing the end-capping additive indicating plasticization of the polycondensates. These compositions will be expected to show enhanced flexibility.

TABLE 10

Compositions Used for DSC

| | Composition, parts by wt | | | |
|---|---|---|---|---|
| Example # | End capping additive, Ex. 1 | PET WA 314 | PLA 4042D | Tg* (° C.) |
| 12-A | 100 | 0 | 0 | −67.0 |
| 12-B | 0 | 100 | 100 | 80.1 |
| 12-C | 0 | 0 | 100 | 58.8 |
| 12-D | 8 | 92 | 0 | 60.8 |
| 12-E | 9 | 91 | 0 | 61.1 |
| 12-F | 10 | 90 | 0 | 60.5 |
| 12-G | 8 | 0 | 92 | 53.5 |
| 12-H | 9 | 0 | 91 | 53.2 |
| 12-J | 10 | 0 | 90 | 52.9 |

*DSC measured using a TA Instruments model 2910/2920 with a 15° C. min$^{-1}$ rate of heating. Values shown are those measured with first heating of sample.

While certain embodiments have been illustrated and described, it should be understood that changes and modifications can be made therein in accordance with ordinary skill in the art without departing from the invention in its broader aspects as defined in the following claims.

What is claimed is:

1. A polymeric composition comprising:
   from 8 to 10 wt % of a mono-functional, low molecular weight, low epoxy content end-cap comprising a polymerization product of:
      at least one epoxy-functional monomer and at least one (meth)acrylic monomer, and
   at least one condensation polymer.

2. The polymeric composition of claim 1, wherein the at least one epoxy-functional monomer is present in an amount of about 4% to about 10% by weight of the total weight of the mono-functional end-cap.

3. The polymeric composition of claim 1, wherein the at least one epoxy-functional monomer is glycidyl methacrylate.

4. The polymeric composition of claim 1, wherein the at least one (meth)acrylic monomer is selected from methyl acrylate, ethyl acrylate, butyl acrylate, methyl (meth)acrylate, ethyl (meth)acrylate, or butyl (meth)acrylate.

5. The polymeric composition of claim 1, wherein the at least one (meth)acrylic monomer is butyl acrylate.

6. The polymeric composition of claim 1, wherein the at least one condensation polymer is selected from the group consisting of polyesters, polyamides, polycarbonates, polyurethanes, polyacetals, polysulfones, polyphenylene ethers, polyether sulfones, polyimides, polyether ketones, polyarylates, polyphenylene sulfides, polyestercarbonates, polyesteramides, and polyalkyls.

7. The polymeric composition of claim 1, wherein the at least one condensation polymer is a condensation polymer that has been recycled or reprocessed.

8. The polymeric composition of claim 1, wherein the polymeric composition is substantially free of gel particles.

9. A method for increasing the molecular weight of a condensation polymer comprising:
   reacting an end-cap comprising: from 8 to 10 wt % of a polymerization product of at least one epoxy-functional monomer and at least one (meth)acrylic monomer; with a polyfunctional chain extender, and at least one condensation polymer to produce an end-capped, chain extended condensation polymer that is substantially free of gel particles.

10. The method of claim 9, wherein the at least one epoxy-functional monomer is present in an amount of about 4% to about 10% by weight of the total weight of the mono-functional end-cap.

11. The method of claim 9, wherein the at least one epoxy-functional monomer is glycidyl (meth)acrylate.

12. The method of claim 9, wherein the at least one (meth)acrylic monomer is selected from methyl acrylate, ethyl acrylate, butyl acrylate, methyl (meth)acrylate, ethyl (meth)acrylate, or butyl (meth)acrylate.

13. The method of claim 9, wherein the at least one (meth)acrylic monomer is butyl acrylate.

14. The method of claim 10, wherein the at least one condensation polymer is selected from polyesters, polyamides, polycarbonates, polyurethanes, polyacetals, polysulfones, polyphenylene ethers, polyether sulfones, polyimides, polyether ketones, polyarylates, polyphenylene sulfides, polyestercarbonates, polyesteramides, or polyalkyls.

15. The method of claim 9, wherein the at least one condensation polymer is a condensation polymer that has been recycled or reprocessed.

16. A method of increasing the flexibility of a condensation polymer comprising
   reacting from 8 to 10 wt % of an end-cap comprising a polymerization product of at least one epoxy-functional monomer and at least one (meth)acrylic monomer with at least one condensation polymer; and
   producing an end-capped condensation polymer that is substantially free of gel particles
   wherein the end-capped condensation polymer has a higher flexibility than the condensation polymer.

17. The method of claim 16, wherein the at least one epoxy-functional monomer is present in an amount of about 4% to about 10% by weight of the total weight of the mono-functional end-cap.

18. The method of claim 16, wherein the at least one epoxy-functional monomer is glycidyl (meth)acrylate.

19. The method of claim 16, wherein the at least one (meth)acrylic monomer is selected from methyl acrylate, ethyl acrylate, butyl acrylate, methyl (meth)acrylate, ethyl (meth)acrylate, or butyl (meth)acrylate.

20. The method of claim 16, wherein the at least one (meth)acrylic monomer is butyl acrylate.

21. The method of claim 16, wherein the at least one condensation polymer is selected from the group consisting of polyesters, polyamides, polycarbonates, polyurethanes, polyacetals, polysulfones, polyphenylene ethers, polyether sulfones, polyimides, polyether ketones, polyarylates, polyphenylene sulfides, polyestercarbonates, polyesteramides, and polyalkyls.

22. The method of claim 18, wherein the at least one condensation polymer is a condensation polymer that has been recycled or reprocessed.

23. The polymeric composition of claim 1, wherein the at least one condensation polymer is polylactic acid.

24. The method of claim 9, wherein the at least one condensation polymer is polylactic acid.

25. The method of claim 16, wherein the at least one condensation polymer is polylactic acid.

26. The polymeric composition of claim 1 further comprising a polyfunctional chain extender.

* * * * *